United States Patent Office 3,123,137
Patented Mar. 3, 1964

3,123,137
COATING SURFACES WITH RESIN
Bill M. Young, John A. Knox, and Roger F. Reasvold, all of Duncan, Okla., assignors to Halliburton Company, a corporation of Delaware
No Drawing. Filed Nov. 3, 1959, Ser. No. 850,521
10 Claims. (Cl. 166—33)

This invention relates to the coating of surfaces with resin and, more specifically, to compositions and methods useful in providing or forming resin coatings, particularly in connection with treating operations performed in oil and gas wells or the like, such as on the surfaces of granular or particulated solids or other structures introduced or present in the well or in the surrounding strata.

It is anticipated that the invention will be applied, for example, in connection with treating operations performed in wells to control loose sand or the like which is tending to migrate from incompetent or otherwise incompletely consolidated zones or formations. In treating operations of this type, it has heretofore been proposed to employ resin-coated granules or particles, such as sand or ground walnut hulls, which are dispersed in an oil carrier prior to being pumped into the well. The resin-coated granules or particles are screened-out or deposited on the face of the loose or unconsolidated zone or formation to be treated, whereupon the resin coating composition is allowed or caused to reach a set or hardened condition so as to bind or cement the granules or particles together. The resulting mass provides a permeable and more or less rigid barrier or support which reduces or prevents the migration of loose materials from the treated zone or formation without, however, objectionably decreasing the oil productivity of the well. For example, see Patent No. 2,815,815 granted to Wayne F. Hower and John A. Knox.

While generally satisfactory results have been obtained in operations of this type following the teachings of the prior art, the need for improvements has been recognized. For one thing, improved bonding or cementing of the resin coating composition onto the surfaces of the solid granules or particles is needed. Also, the permeable barrier or support should reach a relatively high compressive strength without the necessity of waiting an objectionably long period of time after placement of the resin-coated granules or particles at the desired location in the well. At the same time, however, the resin coating composition should remain unset or tacky during the handling and pumping thereof and, in any event, should not reach its final set or hardened condition until after the granules or particles have been screened-out or otherwise deposited in position to become cemented or bound together.

It is further anticipated that the invention will find application in connection with well treating operations involving the placement of a resin-containing fluid composition which may not itself contain sand or other dispersed solids of relatively large size but which is employed in treating structures already present in the well or surrounding strata, such as to consolidate particles of a loose formation sand.

A general object of the present invention is to provide improved compositions and methods useful in coating surfaces with resin.

Another object of the invention is to provide improved compositions and methods useful in well treating operations wherein resin coatings are provided or formed on the surfaces of substances or structures introduced or present in the well or surrounding strata.

Another object of the invention is to provide improved compositions and methods useful in providing or forming resin coatings on granular or particulated solids, such as on sand, ground nut hulls, scoria or the like, and useful in well treating operations involving the introduction of resin-coated solids into the well.

A further and more specific object of the invention is to provide improved sand control compositions and methods involving the placement in a well of a resin-containing composition or resin-coated granular or particulated solids to reduce or prevent the migration of loose sand or the like.

The foregoing and additional objects and advantages are attainable in accordance with the invention, which involves the concept of employing a surface conditioning agent capable of improving the bonding or cementing between a resin-containing composition and a surface coated therewith.

While the invention is not limited to any particular theory of behavior, it is believed that the surface conditioning agent improves the affinity of the surface to be coated for the resin coating applied thereto. Also, the surface conditioning agent may become polymerized with the resin, such as in the presence of a suitable catalyst, thus becoming part of the final plastic. In some instances the surface conditioning agent may actually accelerate the setting or curing of the resin and/or may polymerize with itself in the presence of the same catalyst used to set or cure the resin.

Examples of surface conditioning agents suited for use with linear polyester resins are the unsaturated alcohols, such as allyl alcohol, and the monomeric unsaturates, such as styrene.

In the laboratory, tests were conducted and it was found that when Ottawa sand, 10–20 mesh, was pretreated with styrene and subsequently coated with polyester resin (Naugatuck Chemical Company's Vibrin X–1058 containing cobalt naphthenate and Lupersol D.D.M. as curing agents), a very substantial increase in compressive strength was obtained in comparison with sand which was treated similarly but was not pretreated with styrene. In particular, it was found that a core obtained from the pretreated batch had a compressive strength of 4,125 p.s.i. after setting or curing for only 16 hours at room temperature, while a core obtained from the batch not undergoing the pretreatment had a compressive strength of only 1,585 p.s.i. after setting or curing for 24 hours at room temperature.

Examples of surface conditioning agents found suited for use with phenol-formaldehyde resins are furfuryl alcohol and alcoholic and/or aqueous solutions of phenols or cresols.

Improved sand consolidations were obtained in laboratory tests using either phenol or cresol solution to pretreat sand prior to coating it with phenol-formaldehyde resin (Acme Resin No. 912). Also, furfuryl alcohol was found to be a versatile surface conditioning agent capable of undergoing self-polymerization and accelerating the set of acid-curable phenol-formaldehyde resin (Acme Resin No. 912) under acid conditions.

In one test, walnut shells were pretreated with an isopropyl alcohol solution of cresol and were subsequently coated with Acme 912 resin containing Acme 1906 accelerator, essentially a modified non-organic chloride material. The core was then immersed in a 15% hydrochloric acid solution and allowed to set or cure for two hours at a temperature of 100 degrees Fahrenheit. At the end of the curing period, the core was found to have a compressive strength of 1,354 p.s.i. In a test carried out under essentially the same conditions except that the walnut shells were not pretreated, as aforesaid, the core was found to have a compressive strength of only 658 p.s.i. at the end of the curing period.

In carrying out a well treating operation to control loose sand or the like, the surface conditioning agent may advantageously be applied to the solid granules or particles at or near the well site using conventional equipment. If desired, the solids may be pretreated with the surface conditioning agent prior to the solids being mixed or coated with the resin-containing composition. Alternatively, the surface conditioning agent may be included as part of the resin-containing composition used to coat the solids. In any event, the materials should be thoroughly combined to obtain as nearly as possible a uniform film or coating covering the surfaces of the solids. To this end, a mechanical or other stirring or blending device may be employed to agitate and mix the liquid and solid ingredients together.

It is understood that the resin-containing composition when applied to coat the solids may or may not include the curing agent or catalyst for the resin. For example, the coating may be accomplished using an acid-curable resin-forming composition containing an indirect or delayed action curing agent in the form of one or more acid-forming substances, such as the toluene alpha chlorides described in co-pending United States patent application, Serial No. 788,710, which was filed on January 26, 1959, jointly by Homer C. McLaughlin and one of the inventors herein. Alternatively, the curing agent may be omitted from the coating composition itself and may be applied subsequently, such as by flushing the resin-coated solids with a strong acid solution after placement thereof at a desired location in the well. As another alternative, an indirect or delayed action curing agent may be included in the coating composition but the setting or curing of the resin may nonetheless be accelerated or further assured by subsequently contacting the resin-coated solids with a strong acid solution.

After the solids have been treated with the surface conditioning agent and while the resin-containing composition coating the solids is tacky, or at least prior to the resin being allowed or caused to become finally set or hardened, the coated solids are then dispersed in a carrying fluid which is non-resinous and also is preferably not chemically reactive with the coating material. Examples of mineral or petroleum oil carrying fluids which may be used are crude oil, green oil, diesel fuel, kerosene and the like. For certain applications, aqueous carrying fluids such as water or brine may be employed.

In some instances it may be found that the carrying fluid has a tendency to wash-off or otherwise remove the coating composition from the surfaces of the solids. This effect may be compensated for, at least to some extent, by employing an excess amount of resin in the coating composition so as to obtain or provide a thicker layer which is less likely to be completely removed by the washing or abrading action.

Where a curing agent for the resin is included in the coating composition, it will ordinarily be desirable to delay the mixing together of the resin and curing agent until just prior to coating the solids therewith. The resin-coated solids, with the surface conditioning agent included as part thereof, may then be added without delay to the carrying fluid, whereupon the resulting treating composition or slurry may be pumped or otherwise introduced into the well prior to the coating on the solids reaching a set or hardened condition. A suitable proportioning or blending device may advantageously be employed for mixing the resin-coated solids with the carrying fluid at the well site just prior to the introduction of the ingredients into the well. Where other agents or substances are to be included, these may be added at any convenient times following conventional practices.

Upon being introduced into the well, the treating composition or slurry is conducted downwardly therein and thence into contact with the zone or formation to be treated. One or more well packers or the like may be employed, such as at or near one or both of the upper and lower limits of the zone or formation to be treated, thus facilitating the placement of the treating composition or slurry at the desired location.

If necessary, additional pump pressure is built up and applied to the treating composition or slurry to facilitate injection of the carrying fluid portion thereof into the zone or formation to be treated. The resin-coated solids not entering the well strata are thus caused or allowed to screen out and become packed against the face of structures adjacent the well bore. Some of the resin-coated solids may enter fractures or other openings and some may become intermixed with the loose sand or the like tending to migrate from the zone or formation into the bore of the well. However, at least a portion of the resin-coated solids accumulate or otherwise become massed together at a location between the well bore and the treated zone or formation. Where a curing agent has been included, the accumulated solids and the resin coating thereon in time become a permeable mass of set or hardened material. If desired or necessary, such as where no curing agent has been included, the setting or curing of the resin is accomplished or accelerated after placement of the solids at the desired location in the well. To this end, the solids may be flushed or otherwise contacted with a separate fluid containing a curing agent for the resin. For example, an acid-containing fluid, such as an aqueous solution of hydrochloric acid, may be pumped or otherwise circulated into contact with solids coated with an acid-curable resin.

Due to the inclusion of a surface conditioning agent in accordance with the present invention, the resin coating on the solids is capable of becoming more firmly cemented or bound to the surfaces in contact therewith. Accordingly, when the curing agent or catalyst for the resin has accomplished the setting or hardening thereof, either directly or indirectly, the resulting permeable mass provides a barrier or support of relatively high compressive strength. As a result, the barrier or support which is thus provided is capable of offering great resistance to further migration of loose sand or the like from the treated zone or formation into the well bore. At the same time, since the barrier or support is permeable, the ability of the zone or formation to pass oil or other fluids into the well bore is not objectionably decreased.

It is understood that, in some instances, it may be desirable for the surface conditioning agent to be applied to structures already present in the well bore or adjacent strata, such as to the accessible surfaces of a formation sand which is to be subsequently treated with a resin-containing composition. Accordingly, the invention is not limited to applications where solids are introduced into a well after being treated with the surface conditioning agent. Also, it is believed that various other alternative procedures and modifications, coming within the scope of the appended claims, will now present themselves to those skilled in the art.

What is claimed is:

1. A method of treating loose sands with a resin for the consolidation thereof, comprising the steps of:
    (a) coating the surfaces of the loose sands with a surface conditioning agent which enhances the affinity of the surfaces of said loose sands for the resin and after catalyzation polymerizes with said resin, and thereby improve the bonding of said resin with said loose sands;
    (b) coating the surfaces of said loose sands with said resin; and
    (c) causing said resin and said surface conditioning agent to polymerize into a hardened permeable mass with said loose sands, thereby forming a consolidated formation having a compressive strength substantially greater than that which could be obtained using said resin alone.

2. The method of claim 1, wherein said resin is a linear polyester resin and said surface conditioning agent is selected from the group consisting of an unsaturated alcohol and a polymerizable monomeric unsaturated compound.

3. The method of claim 1, wherein said resin is a linear polyester resin and said surface conditioning agent is selected from the group consisting of allyl alcohol and styrene.

4. The method of claim 1, wherein said resin is a phenol-formaldehyde resin and said surface conditioning agent is selected from the group consisting of furfuryl alcohol, alcoholic solutions of phenols, alcoholic solutions of cresols, aqueous solutions of phenols, and aqueous solutions of cresols.

5. The method of claim 1, wherein said resin is a phenol formaldehyde resin and said surface conditioning agent is an isopropyl alcohol solution of cresol.

6. A method of consolidating particulated solids with a resin, comprising the steps of:
   (a) applying a surface conditioning agent to the surface of a quantity of the particulated solids, said surface conditioning agent improving the affinity of the surfaces of the particulated solids for the resin for improving the bonding of the resin with the particulated solids;
   (b) applying a coating of the resin to the surfaces of the particulated solids;
   (c) placing the particulated solids in position to form a permeable mass, with the coatings of the adjacent surfaces of the particulated solids becoming combined; and
   (d) retaining the particulated solids in said position until the resin and the surface conditioning agent have polymerized with each other and into a hardened plastic, thereby forming a permeable mass having an improved compressive strength.

7. The method of claim 6, wherein said resin is a linear polyester resin and said surface conditioning agent is selected from the group consisting of an unsaturated alcohol and a polymerizable monomeric unsaturated compound.

8. The method of claim 6, wherein said resin is a linear polyester resin and said surface conditioning agent is selected from the group consisting of allyl alcohol and styrene.

9. The method of claim 6, wherein said resin is a phenol-formaldehyde resin and said surface conditioning agent is selected from the group consisting of furfuryl alcohol, alcoholic solutions of phenols, and aqueous solutions of cresols.

10. The method of claim 6, wherein said resin is a phenol formaldehyde resin and said surface conditioning agent is an isopropyl alcohol solution of cresol.

References Cited in the file of this patent

UNITED STATES PATENTS

| | | |
|---|---|---|
| 2,274,297 | Irons et al. | Feb. 24, 1942 |
| 2,378,817 | Wrightsman et al. | June 19, 1945 |
| 2,604,172 | Wrightsman | July 22, 1952 |
| 2,644,772 | Kaye | July 7, 1953 |
| 2,786,530 | Maly | Mar. 26, 1957 |
| 2,823,753 | Henderson et al. | Feb. 18, 1958 |
| 3,047,067 | Williams et al. | July 31, 1962 |